United States Patent
Peacock et al.

(10) Patent No.: US 11,238,185 B2
(45) Date of Patent: Feb. 1, 2022

(54) INTEGRATED, PERSISTENT SECURITY MONITORING OF ELECTRONIC MERCHANDISE

(71) Applicant: Sennco Solutions, Inc., Plainfield, IL (US)

(72) Inventors: Brian Peacock, Melbourne, FL (US); Dale R. Liff, Montgomery, IL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 230 days.

(21) Appl. No.: 15/914,600

(22) Filed: Mar. 7, 2018

(65) Prior Publication Data
US 2018/0260587 A1 Sep. 13, 2018

Related U.S. Application Data

(60) Provisional application No. 62/468,263, filed on Mar. 7, 2017.

(51) Int. Cl.
*G06F 21/88* (2013.01)
*G06F 16/955* (2019.01)
(Continued)

(52) U.S. Cl.
CPC ............ *G06F 21/88* (2013.01); *G06F 9/4416* (2013.01); *G06F 16/955* (2019.01);
(Continued)

(58) Field of Classification Search
CPC ...... G06F 21/88; G06F 16/955; G06F 21/554; G06F 9/4416; G06F 2221/034;
(Continued)

(56) References Cited

U.S. PATENT DOCUMENTS

| 8,140,012 B1 * | 3/2012 | Causey ............. G08B 21/0247 455/41.2 |
| 8,387,141 B1 * | 2/2013 | Zhukov ................. H04L 51/12 726/22 |

(Continued)

FOREIGN PATENT DOCUMENTS

WO WO-2016072833 A1 * 5/2016 .......... G06F 11/1441

OTHER PUBLICATIONS

ESR Aug. 6, 2018, European Search Report cited in corresponding European Patent Application No. 18160482.8; dated Aug. 6, 2018; 10 pages.

(Continued)

*Primary Examiner* — David Garcia Cervetti
(74) *Attorney, Agent, or Firm* — Lempia Summerfield Katz LLC

(57) ABSTRACT

An electronic device configured for retail display includes a persistent memory on which boot instructions are stored, a storage device on which security monitoring instructions are stored, and a processor configured to execute the boot instructions during a boot sequence to initiate execution of the security monitoring instructions. The processor is further configured, via the execution of the security monitoring instructions, to monitor the retail display of the electronic device for a security trigger event and, upon detection of the trigger event, lock a user interface of the electronic device.

13 Claims, 3 Drawing Sheets

(51) Int. Cl.
*G08B 13/14* (2006.01)
*G06F 9/4401* (2018.01)
*G06F 21/55* (2013.01)
*G08B 13/22* (2006.01)

(52) U.S. Cl.
CPC ........... *G06F 21/554* (2013.01); *G08B 13/14* (2013.01); *G08B 13/22* (2013.01); *G06F 2221/034* (2013.01)

(58) Field of Classification Search
CPC ............. G06F 9/4401; G06F 2221/033; G06F 2201/865; G06F 21/56; G06F 21/566; G06F 21/50; G06F 21/54; G06F 21/53; G06F 21/55; G06F 21/572; G06F 21/577; G06F 21/575; G06F 21/74; G06F 21/57; G06F 21/552; G06F 21/51; G06F 21/52; G06F 11/1417; G08B 13/14; G08B 13/22
See application file for complete search history.

(56) References Cited

U.S. PATENT DOCUMENTS

| | | | |
|---|---|---|---|
| 8,878,673 B2 | 11/2014 | Grant | |
| 9,220,011 B1* | 12/2015 | Annan | H04W 12/08 |
| 9,552,708 B2 | 1/2017 | Grant | |
| 9,602,508 B1* | 3/2017 | Mahaffey | H04L 63/10 |
| 9,639,692 B1* | 5/2017 | Xue | H04W 12/126 |
| 9,665,913 B2* | 5/2017 | Loutit | H04W 12/12 |
| 9,728,054 B2 | 8/2017 | Grant | |
| 9,779,603 B1* | 10/2017 | Subramanian | H04L 67/306 |
| 9,904,784 B2* | 2/2018 | Diehl | G06F 21/567 |
| 9,928,703 B2 | 3/2018 | Grant | |
| 10,002,505 B1 | 6/2018 | Grant | |
| 10,102,369 B2* | 10/2018 | Healy | G06F 21/552 |
| 10,237,742 B2* | 3/2019 | Zeiler | H04W 4/021 |
| 10,438,469 B1* | 10/2019 | Subramanian | G08B 13/2454 |
| 10,475,307 B2 | 11/2019 | Grant | |
| 10,548,015 B2* | 1/2020 | Hui | H04L 63/10 |
| 10,607,465 B1* | 3/2020 | Subramanian | G08B 13/2454 |
| 10,623,960 B2* | 4/2020 | Mahaffey | H04W 4/029 |
| 10,650,159 B1* | 5/2020 | Paczkowski | G06F 21/6218 |
| 10,762,216 B2* | 9/2020 | Ouyang | G06F 21/32 |
| 2006/0206492 A1* | 9/2006 | Lipscomb | G11B 27/034 |
| 2006/0272020 A1 | 11/2006 | Gardner | |
| 2009/0253408 A1* | 10/2009 | Fitzgerald | H04M 1/72457 |
| | | | 455/411 |
| 2009/0253410 A1* | 10/2009 | Fitzgerald | H04W 12/12 |
| | | | 455/411 |
| 2009/0293560 A1* | 12/2009 | Ikeguchi | G06F 21/88 |
| | | | 70/262 |
| 2010/0037323 A1* | 2/2010 | Lemieux | G06F 21/88 |
| | | | 726/26 |
| 2010/0273452 A1* | 10/2010 | Rajann | G06F 21/88 |
| | | | 455/411 |
| 2010/0279673 A1* | 11/2010 | Sharp | H04L 67/125 |
| | | | 455/419 |
| 2010/0279675 A1* | 11/2010 | Slack | G06F 9/4843 |
| | | | 455/419 |
| 2011/0072132 A1* | 3/2011 | Shafer | G06Q 10/087 |
| | | | 709/224 |
| 2011/0076986 A1* | 3/2011 | Glendinning | G06F 21/88 |
| | | | 455/411 |
| 2011/0215921 A1* | 9/2011 | Ben Ayed | H04B 7/00 |
| | | | 340/539.11 |
| 2012/0075098 A1* | 3/2012 | Kuncl | H04W 12/126 |
| | | | 340/539.32 |
| 2013/0019304 A1* | 1/2013 | Cai | H04W 52/0264 |
| | | | 726/16 |
| 2013/0169434 A1* | 7/2013 | McCown | G08B 21/00 |
| | | | 340/540 |
| 2013/0210389 A1* | 8/2013 | Obaidi | H04W 8/245 |
| | | | 455/411 |
| 2013/0219041 A1 | 8/2013 | Gardner | |
| 2013/0226742 A1* | 8/2013 | Johnson | G06Q 10/087 |
| | | | 705/27.1 |
| 2013/0281058 A1* | 10/2013 | Obaidi | G06F 21/88 |
| | | | 455/411 |
| 2013/0326642 A1* | 12/2013 | Hajj | H04L 67/18 |
| | | | 726/34 |
| 2014/0033774 A1* | 2/2014 | Ofchus | G07C 9/00571 |
| | | | 70/264 |
| 2014/0038556 A1* | 2/2014 | De Sousa | H04W 12/06 |
| | | | 455/411 |
| 2014/0059828 A1 | 3/2014 | Reynolds et al. | |
| 2014/0223322 A1* | 8/2014 | Slack | G06F 3/0482 |
| | | | 715/740 |
| 2014/0282877 A1* | 9/2014 | Mahaffey | H04W 12/08 |
| | | | 726/3 |
| 2014/0298485 A1 | 10/2014 | Gardner | |
| 2014/0364099 A1* | 12/2014 | Pai | G06F 9/44505 |
| | | | 455/418 |
| 2014/0366164 A1* | 12/2014 | Hoefgen | G06F 21/88 |
| | | | 726/34 |
| 2014/0372743 A1* | 12/2014 | Rogers | H04W 12/126 |
| | | | 713/2 |
| 2014/0373184 A1* | 12/2014 | Mahaffey | G06F 21/88 |
| | | | 726/35 |
| 2015/0040239 A1* | 2/2015 | Buerk | H04L 63/20 |
| | | | 726/26 |
| 2015/0089674 A1* | 3/2015 | Clapham | G06F 21/00 |
| | | | 726/34 |
| 2015/0094023 A1* | 4/2015 | Abramson | G06F 21/88 |
| | | | 455/411 |
| 2015/0148007 A1* | 5/2015 | Mitchell | H04W 12/126 |
| | | | 455/411 |
| 2015/0240531 A1* | 8/2015 | Blust | E05B 65/46 |
| | | | 340/5.5 |
| 2015/0254449 A1* | 9/2015 | Poiesz | G06F 21/31 |
| | | | 726/19 |
| 2015/0341219 A1* | 11/2015 | Hong | H04L 43/04 |
| | | | 709/224 |
| 2016/0042620 A1 | 2/2016 | Dandie et al. | |
| 2016/0134930 A1* | 5/2016 | Swafford | A47F 5/0068 |
| | | | 725/80 |
| 2016/0227411 A1* | 8/2016 | Lundblade | G06F 21/31 |
| 2016/0253651 A1* | 9/2016 | Park | G06Q 20/321 |
| | | | 705/39 |
| 2016/0267298 A1* | 9/2016 | Tucker | G06F 21/88 |
| 2016/0302071 A1* | 10/2016 | Jones | H04W 8/18 |
| 2016/0307415 A1 | 10/2016 | Marszalek et al. | |
| 2016/0337863 A1* | 11/2016 | Robinson | H04W 4/021 |
| 2016/0344862 A1* | 11/2016 | Tucker | H04W 12/37 |
| 2017/0103647 A1* | 4/2017 | Davis | H04W 12/082 |
| 2017/0164267 A1* | 6/2017 | Marka | H04W 52/0251 |
| 2017/0168533 A1* | 6/2017 | Rhoads | G06F 9/4401 |
| 2017/0230515 A1* | 8/2017 | Velusamy | H04M 17/204 |
| 2017/0272950 A1* | 9/2017 | Venkataramanachari | |
| | | | H04W 12/06 |
| 2017/0280364 A1* | 9/2017 | Lu | H04W 12/126 |
| 2017/0337390 A1* | 11/2017 | Hamilton | H04L 9/0861 |
| 2017/0359555 A1* | 12/2017 | Irani | H04L 12/2818 |
| 2017/0372055 A1* | 12/2017 | Robinson | H04L 63/105 |
| 2018/0204636 A1* | 7/2018 | Edwards | G16H 40/67 |
| 2018/0211501 A1* | 7/2018 | Ewing | G08B 13/2434 |
| 2018/0288720 A1* | 10/2018 | Blaser | G06Q 20/203 |
| 2018/0288721 A1* | 10/2018 | Blaser | H04L 67/18 |
| 2018/0288722 A1* | 10/2018 | Blaser | H04L 67/04 |
| 2018/0316381 A1* | 11/2018 | Sharma | H04B 1/401 |
| 2019/0286806 A1* | 9/2019 | Robinson | H04W 12/64 |
| 2021/0194528 A1* | 6/2021 | Zalewski | H04W 76/14 |

OTHER PUBLICATIONS

Office Action cited in the corresponding European App. No. 18160482.8; dated Oct. 1, 2020; 6pp.

(56) References Cited

OTHER PUBLICATIONS

Office Action cited in corresponding European App. No. 18160482.8; dated Jun. 4, 2021; 6pp.

* cited by examiner

INTEGRATED, PERSISTENT SECURITY MONITORING OF ELECTRONIC MERCHANDISE

CROSS-REFERENCE TO RELATED APPLICATION

This application claims the benefit of U.S. provisional application entitled "Software Security Solution," filed Mar. 7, 2017, and assigned Ser. No. 62/468,263, the entire disclosure of which is hereby expressly incorporated by reference.

BACKGROUND OF THE DISCLOSURE

Field of the Disclosure

The disclosure relates generally to security monitoring of electronic merchandise on display.

Brief Description of Related Technology

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product. Despite allowing for such interaction, security devices and other security mechanisms may nonetheless undesirably restrict or inhibit consumer evaluation of the merchandise.

SUMMARY OF THE DISCLOSURE

In accordance with one aspect of the disclosure, an electronic device configured for retail display includes a persistent memory on which boot instructions are stored, a storage device on which security monitoring instructions are stored, and a processor configured to execute the boot instructions during a boot sequence to initiate execution of the security monitoring instructions. The processor is further configured, via the execution of the security monitoring instructions, to monitor the retail display of the electronic device for a security trigger event and, upon detection of the trigger event, lock a user interface of the electronic device.

In accordance with another aspect of the disclosure, a method of monitoring an electronic device on retail display includes executing, by a processor of the electronic device, boot instructions stored in a persistent memory of the electronic device to initiate execution of security monitoring instructions by the processor of the electronic device, obtaining, by the processor in accordance with the security monitoring instructions, status data indicative of a status of the retail display, analyzing, by the processor in accordance with the security monitoring instructions, the status data to monitor the status of the retail display for a security trigger event, and if the security trigger event is detected, locking, by the processor in accordance with the security monitoring instructions, a user interface of the electronic device.

In accordance with yet another aspect of the disclosure, a method of establishing security monitoring for an electronic device on retail display includes obtaining, by a processor of the electronic device, retail data indicative of either the electronic device or the retail display, processing, by the processor of the electronic device, the retail data to determine whether to initiate execution, by the processor of the electronic device, of security monitoring instructions stored on a storage device of the electronic device, and initiating, by the processor of the electronic device, the execution of the security monitoring instructions in accordance with results of processing the retail data. Obtaining the data, evaluating the data, and initiating the execution, are implemented via execution, by the processor of the electronic device, of instructions stored on a persistent memory of the electronic device.

In connection with any one of the aforementioned aspects, the devices and methods described herein may alternatively or additionally include any combination of one or more of the following aspects or features. The persistent memory has firmware for the electronic device stored thereon, the firmware including the boot instructions. Execution of the boot instructions causes the processor to determine whether to initiate the execution of the security monitoring instructions. Execution of the boot instructions causes the processor to attach an agent defined via the security monitoring instructions to a persistent service running on the processor. Execution of the boot instructions causes the processor to send a query with identification data indicative of an identity of the electronic device to a remote database to determine whether to initiate the execution of the security monitoring instructions. Execution of the boot instructions causes the processor to access the persistent memory to obtain the identification data. Execution of the security monitoring instructions causes the processor, upon the detection of the trigger event, to generate a warning on a display of the electronic device regarding a locking of the electronic device until the trigger event ends. The execution of the security monitoring instructions causes the processor, upon the detection of the trigger event, to generate an alarm that cannot be deactivated by discontinuing the trigger event. The execution of the security monitoring instructions causes the processor to lock the user interface of the electronic device before removal of the electronic device from a retail site in which the retail display is provided. The security monitoring instructions are executed within a background service running on the processor. The security monitoring instructions are stored in a non-volatile storage device of the electronic device. The method further includes, upon detection of the trigger event, generating a warning on a display of the electronic device regarding a locking of the electronic device until the trigger event ends. The method further includes, upon detection of the trigger event, generating an alarm that cannot be deactivated by discontinuing the trigger event. Locking the user interface of the electronic device is implemented before removal of the electronic device from a retail site in which the retail display is provided. Obtaining the retail data includes accessing identification data indicative of an identity of the electronic device, and processing the retail data includes evaluating the identification data. Accessing the identification includes accessing the persistent memory of the electronic device. Processing the retail data includes communicating with a server computer to evaluate the retail data against a database on the server computer. Initiating the execution causes the processor to attach an agent defined via the security monitoring instructions to a background service running on the processor

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
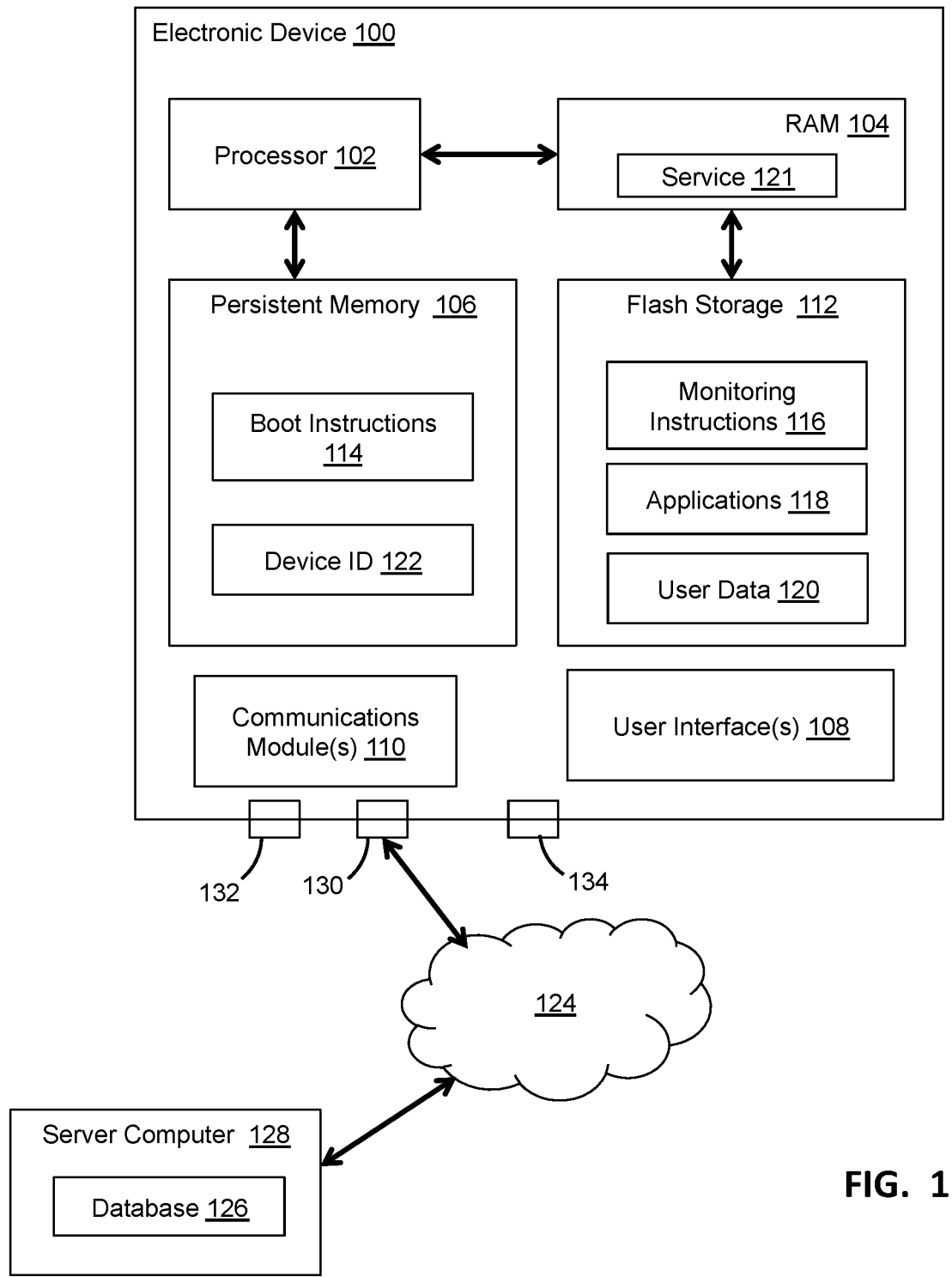
FIG. 1 is a block diagram of an electronic device configured for retail display and providing integrated, persistent security monitoring in accordance with one example.

The disclosed devices and methods are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

Devices and methods for security monitoring merchandise on display are described. The merchandise is or includes an electronic device. The security monitoring methods are implemented by the electronic device itself. The security monitoring is thus provided in a manner integrated with the electronic device on display. The retail environment may consequently not need to rely on tethers, security tags, proximity sensors, or other security mechanisms to deter theft. Alternatively, the integrated security monitoring provided by the disclosed devices and methods may be used in conjunction with such other security mechanisms. Using the device itself to implement the security monitoring avoids having to rely on communications with a remote unit, such as a server computer or other networked computing device. Theft attempts may thus be met with an immediate response, e.g., a bricking or other benefit denial, thereby deterring a theft attempt before the electronic device leaves the retail site.

The disclosed devices and methods provide a persistent security monitoring, avoiding the limitations of other integrated monitoring techniques. Integrated security monitoring presents a technical problem or challenge involving how to continue or sustain the implementation of the security monitoring if a user attempts to disable, shutdown, or otherwise discontinue the security monitoring. For instance, a user attempting to steal the electronic merchandise may close an application providing security monitoring, shutdown the electronic device, or perform a factory reset of the electronic device. The disclosed devices and methods provide a technical solution(s) to this technical problem. In one aspect, the execution of security monitoring instructions is initiated via execution of boot instructions during a boot (e.g., startup) sequence. The boot instructions may be stored on a persistent memory (e.g., as firmware) of the electronic device. In another aspect, the security monitoring instructions may be executed within a background service running on a processor of the electronic device, rather than, for instance, as an application running in the foreground or otherwise accessible to the user via a user interface. The background service may be a persistent service, such as an Android Persistent Service (APS).

Other technical problems and challenges presented by integrated security monitoring are addressed by the disclosed devices and methods. For instance, the amount of space available in persistent memory may be limited. The disclosed methods and systems may conserve space in the persistent memory by configuring the boot instructions to initiate security monitoring instructions stored elsewhere on the electronic device. For instance, the security monitoring instructions may be stored on a storage device, such as a flash storage device. In some cases, the security monitoring instructions define an agent that implements one or more security monitoring procedures. The boot instructions may cause the agent to be attached to a persistent or other background service without having to store all of the instructions for the agent in persistent memory.

Yet another example of a technical problem or challenge addressed by the disclosed devices and methods involves the temporary nature of the security monitoring. As merchandise for sale, the electronic device will eventually cease to be on display. The security monitoring of the disclosed devices and methods should no longer be implemented once the electronic device is sold or otherwise transferred. The disclosed devices and methods are capable of discontinuing the security monitoring despite the steps taken to establish persistent security monitoring. To that end, the boot instructions are configured to determine whether to initiate the security monitoring. In some cases, the determination includes querying a remote database, a networked device (e.g., a server computer), or other offsite device. Other techniques for obtaining data indicative of whether the security monitoring should be implemented or discontinued may be used, including, for instance, connection of, or other local communication with, a local device. Following the determination that security monitoring should be discontinued, the boot instructions may also provide an operator, such as a store clerk, with an opportunity to download a firmware or other update to the electronic device to remove or otherwise permanently deactivate the boot instructions relating to the security monitoring.

The disclosed devices and methods are not limited to any particular type of electronic merchandise or type of retail environment or site. The integrated nature of the disclosed devices and methods allows the nature of the retail environment to vary considerably. For instance, the retail site may be a kiosk rather than a standalone store with a dedicated entrance or exit. The nature of the electronic merchandise may also vary considerably. While the disclosed devices and systems may be useful in connection with smartphones and other portable electronic devices, the electronic devices may or may not be handheld or portable. For instance, the disclosed devices and methods may be useful in connection with televisions and other large scale devices.

Turning to the drawing figures, FIG. 1 depicts an electronic device 100 configured for retail display. The electronic device 100 may be merchandise for sale and/or part of an exhibit or other display of items for sale. For example, the electronic device 100 may be a smartphone, tablet, or laptop computer. The electronic device 100 may or may not be considered to be or include a computer or computing device. For instance, the electronic device 100 may be a television or monitor. The size, form factor, and other characteristics of the electronic device 100 may thus vary considerably.

The retail display may be in a store or other retail site or environment. The retail display may include one or more fixtures, such as a display stand, base, etc. The retail display and environment may have other security monitoring systems in operation to prevent or deter theft of the electronic device 100 and other merchandise on display. For instance, a wireless security system may be provided, such as the system described in U.S. Patent Publication No. 2016/0307415 ("Apparatus, System and Method for Monitoring a Device within a Zone"), the entire disclosure of which is hereby incorporated by reference. Alternatively or additionally, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The electronic device 100 is configured to provide security monitoring for itself. Such self-monitoring may replace or augment the security measures established by other items in the retail environment. For instance, the self-monitoring may provide redundancy, which may be useful in circumstances in which a site system fails or is otherwise disabled, or when the cutting of a tether or cable is not detected.

The electronic device 100 includes a processor 102. The processor 102 executes instructions to implement security monitoring methods as described herein. But the processor 102 may not be dedicated to implementing security-related tasks. Indeed, the processor 102 may be the primary processor of the electronic device 100. For instance, the processor 102 may be used to perform any number of non-security-related processing tasks or operations for the electronic device 100. In some cases, the processor 102 is or includes a central processing unit (CPU) or other general-purpose processing unit. For example, the processor 102 may be a microprocessor, microcontroller, programmable logic array (PLA), or field programmable gate array (FPGA). Alternatively or additionally, the processor 102 is or includes dedicated or specific processing functionality. For instance, the processor 102 may be or include a graphics processing unit (GPU), a digital signal processor (DSP), or other type of application-specific processor or processing unit. In some cases, the processor 102 is implemented as an application-specific integrated circuit (ASIC). The processor 102 may include one or more processing cores or other units integrated with one another to any extent. The processor 102 may be provided on one or more integrated circuits or integrated circuit (IC) chips. The processor 102 may be integrated with one or more other components of the electronic device 100, such as a memory unit or a communications module. For example, in some cases, the processor 102 is a component of a system-on-a-chip (SoC).

The electronic device 100 includes one or more memory units on which instructions are stored. The instructions configure the processor 102 or other cause the processor 102 to implement tasks or other operations. In the example of FIG. 1, the electronic device includes a random access memory (RAM) or other volatile memory 104 and a persistent memory 106. Both of the memories 104, 106 may be directly addressable and accessible by the processor 102 via, for instance, a memory bus. The persistent memory 106 may be read-only memory (ROM) or other non-volatile memory. Firmware for the electronic device 100 may be stored on the persistent memory 106. Each of the RAM 104 and the persistent memory 106 may include one or more memory units or memories (e.g., memory chips).

In the example of FIG. 1, the electronic device 100 includes one or more user interfaces 108 and one or more communication modules 110. The user interface 108 establishes the manner in which a user interacts or otherwise uses the electronic device 100. For instance, the user interface 108 may include a display, such as a touchscreen. Alternative or additional user interfaces may be provided, including, for instance, a keyboard, speaker, microphone, or other input/output device. The communication module 110 supports communications, such as wireless communications, with remote devices. In some cases, the communication module 110 may include an antenna, a transceiver, and/or other components for supporting the communications. The communications may be in accordance with various communication protocols.

The electronic device 100 also includes a storage device 112. Data stored on the storage device 112 is not directly addressable by the processor 102, in contrast to the memories 104, 106. In the example shown, data on the storage device 112 is copied to the RAM 104 prior to use by the processor 102. The storage device 112 may be or include flash storage in the form of a solid state drive (SSD). Alternatively or additionally, the storage device 112 is or includes a hard disk drive. The storage device 112 may include one or more storage devices. The configuration, construction, storage technology, and other characteristics of the storage device 112 may vary.

Boot instructions 114 are stored on the persistent memory 106. In some cases, the boot instructions 114 are stored as firmware of the electronic device 100. The firmware of the electronic device 100 may thus include the boot instructions 114 in some cases. The processor 102 is configured to execute the boot instructions 114 during a boot sequence of the electronic device 100. The boot sequence may be any startup sequence, including, for instance, a sequence implemented at a power cycle, power-on, factory or other reset, or other restart or startup. In some cases, the boot instructions 114 are implemented as a basic input/output system (BIOS) routine or a portion thereof. In other cases, the boot instructions 114 may be called by a BIOS routine as, for instance, a subroutine. But the boot instructions 114 are not limited to instructions set forth in, or called by, a BIOS routine. For example, the boot instructions 114 may be implemented in connection with a loading of an operating system for the electronic device 114.

Security monitoring functionality is initiated via execution of the boot instructions 114 by the processor 102. The security monitoring functionality is provided via security monitoring instructions 116 stored on the storage device 112. The processor 102 is configured to execute the boot instructions 114 during the boot sequence to initiate execution of the security monitoring instructions 116. For example, the boot instructions 114 may include one or more subroutine or other calls or other references to the security monitoring instructions 116. The security monitoring functionality is thus initiated upon any rest or restart of the electronic device 100.

Initiation of the execution of the security monitoring instructions 116 at reset or startup is accomplished despite storage of the security monitoring instructions 116 outside of the persistent memory 106. The security monitoring instructions 116 may be stored in the storage device 112 alongside applications 118 and user data 120. The applications 118 may be or include applications installed on the electronic device 100. In some cases, the security monitoring instructions 116 may be stored as a standalone application. The user data 120 be or may include data generated by a user during use of the applications 118, including data generated as a result of execution of the security monitoring instructions 116.

The nature of the boot instructions 114 related to the security monitoring functionality may vary. For instance, the manner in which the boot instructions 114 initiates execution of the security monitoring instructions 116 may vary. In some cases, the security-related boot instructions 114 are limited to a callout or other reference to the security monitoring instructions 116. The callout or other reference may be set forth in the boot instructions 114 in the context of establishing a persistent or other background application or service 121 to be executed or implemented by the electronic device 100. Instructions and/or other data associated with the background service 121 may be stored in the RAM 104 for use by the processor 102. The callout or other reference limits the amount of persistent memory consumed by the security-related boot instructions 114.

The callout or other reference may be a generic reference or pointer to an instruction or other data set that establishes a number of persistent applications for execution by the processor 102. For example, the data set may include a listing of a subset of the applications 118 and other instruction sets stored in the storage device 112 to be executed on a background or other persistent basis. The monitoring instructions 116 may then be specified in the listing. The listing or other data set may be modified accordingly. This approach may be useful in connection with electronic devices that have un-modifiable or non-accessible persistent memory. The manufacturer does not provide access to the firmware or other persistent memory 106, but does allow the listing or data set to be customized.

In other cases, the boot instructions 114 set forth instructions beyond a callout or reference to the security monitoring instructions 116 (or a listing of background or persistent applications). For instance, the boot instructions 114 may include instructions directed to determining whether the security monitoring instructions 116 should be called or otherwise initiated. As described further below, the boot instructions 114 may configure the processor 102 to obtain retail data indicative of either the electronic device 100 or the retail display, and to processor the retail data to determine whether to initiate the execution of the security monitoring instructions 116. The retail data may be, for instance, a device identification number 122 accessed from, in the example of FIG. 1, the persistent memory 106. The device identification number 122 may be a serial number or any other data indicative of an identity of the electronic device 100. Other types of retail data may be used, including, for instance, a store identification number or a display fixture identification number. The manner in which the retail data is stored and obtained may vary accordingly.

Processing of the retail data by the boot instructions 114 may include sending a query to determine whether the electronic device 100 (e.g., this particular instance of the electronic device 100) should be subjected to security monitoring. Execution of the boot instructions 114 causes the processor 102 to send a query with identification data indicative of an identity of the electronic device 102 to determine whether to initiate the execution of the security monitoring instructions. In the example of FIG. 1, the query is sent via the internet 124 to a remote database 126 hosted by a server computer 128. Network communications with the server computer 128 may be supported by an antenna 130 of the electronic device 100. The database 126 may include a list, table or other dataset identifying electronic devices currently subjected to security monitoring. To allow the device to be sold, the device identification number is removed from the database. Other networked and non-networked devices may be used to store the remote database 126.

The determination may be made in other ways. For instance, the electronic device 100 may include one or more data communication ports 132 (e.g., a universal serial bus, or USB, port) or sensors (e.g., a camera) to capture or otherwise obtain the retail data. For example, a retail store employee may insert a USB dongle into the input port 132 or hold up a symbol (e.g., a quick response (QR) code to the camera during device startup. The USB dongle or QR code symbol may be used to initiate the security monitoring for that restart and all subsequent restarts until data from the same or a different USB dongle, symbol, or other item is captured during startup. The nature of the retail data may thus vary considerably.

The boot instructions 114 may set forth other instructions in alternative or addition to a callout or reference to the security monitoring instructions 116, or a routine directed to determining whether to initiate the security monitoring instructions 116. For example, the boot instructions 114 may establish a persistent service or application for implementation by the processor 102 throughout operation of the electronic device 100. In Android cases, the persistent service may be an Android Persistent Service (APS). Execution of the boot instructions 114 may cause the processor 102 to attach an agent defined via the security monitoring instructions 116 to a persistent service running on the processor 102. The persistent service may provide various security-related functionality via attachment of the agent of the security monitoring instructions 116. In some cases, the boot instructions 114 may attach the agent to the persistent service upon determining that security monitoring should be initiated. The manner in which the agent is attached to the persistent service may vary. For instance, attachment of the agent may include or involve association, incorporation with, activation of, instructions defining the agent with or into the instructions of the persistent service. Further details regarding examples of these and other aspects of, or involving, the agent are set forth in U.S. Patent Publications 2006/0272020 ("Persistent servicing agent"), 2013/0219041 ("Extensible protocol for low memory agent"), and 2014/0298485 ("Persistent agent supported by processor"), the entire disclosures of which are hereby incorporated by reference.

The processor 102 is configured, via the execution of the security monitoring instructions 116, to monitor the retail display of the electronic device 100 for a security trigger event. The monitoring for the security trigger event may use one or more components of the electronic device 100. For example, the electronic device 100 may include an accelerometer or other sensor configured to detect and characterize movement. One or more antennas or other electromagnetic circuitry of the electronic device 100 may be used to detect or determine distances. The monitoring may also involve detecting a disconnection at one or more ports or interfaces of the electronic device 100, such as the ports 130, 132, and a power port 134. Examples of trigger events involving such sensors and circuitry include removing the electronic device 100 from a proximity zone, moving the electronic device 100 is a manner indicative of theft, or one or more disconnections of the electronic device 100, such as disconnection form a power source.

The monitoring for a trigger event may also involve communications or other interaction with another device. For example, the electronic device 100 may receive a signal or message from an alarm unit or other security system component indicative of an alarm condition within the retail store. An attempted theft of other merchandise in the retail environment may thus lock down other merchandise on display.

The trigger event may involve the operation of the electronic device 100 itself. For instance, the processor 102 may be configured via execution of the monitoring instructions 116 to consider various user actions a trigger event. Examples include (i) an attempt to delete or disable an application, firmware, or other monitoring instructions, (ii) discontinue a monitoring service, (iii) detach an agent of the monitoring service, or (iv) power-off the electronic device 100. Other types of trigger events may be used.

Upon detection of the trigger event, the execution of the security monitoring instructions 116 causes the processor to lock the user interface(s) 108 of the electronic device 100. For instance, a touchscreen or other display may display a warning message regarding a locking of the electronic device 100 until the trigger event ends. The warning message may continue to be displayed until the trigger event is no longer present.

The nature of the locking may vary with the type of trigger event. In some cases, the security monitoring instructions 116 define multiple levels of locking. For instance, a major or primary trigger event may cause the security monitoring instructions 116 to configure the processor 102, upon the detection of the trigger event, to generate an alarm that cannot be deactivated by merely discontinuing the trigger event. Unlocking the electronic device 100 may need to involve a key, code, or other disarming mechanism. In contrast, some trigger events may be sufficiently minor or secondary that removal of the trigger event automatically unlocks the electronic device 100.

Whether primary or secondary, the trigger events may be defined by the security monitoring instructions 116 such that the user interface 108 is locked before removal of the electronic device 100 from the retail site. Such immediacy of the locking may help to deter and/or prevent theft. The nature, extent, duration, unlocking and/or other characteristics of the lock may vary considerably.

The trigger event and locking may not involve a theft attempt. For instance, the security monitoring instructions 116 may be directed to preserving a display state of the electronic device 100. In some cases, the trigger event may involve a user attempt to sign in/out of an application or service. Signing out of a service may load personal data or otherwise personalize the electronic device 100 in a manner inappropriate for a retail environment. The monitoring instructions 116 may detect an attempt at signing out of a user account directed to retail display. The locking may thus inhibit the customization of the electronic device 100. The monitoring instructions 116 may alternatively or additionally alert a store employee of the need to wipe or clear user data from the electronic device 100. In some cases, the monitoring instructions 116 configure the processor 102 to prompt the store employee, e.g., after an unlocking, to initiate a device wipe or other housekeeping.

Figure 2:
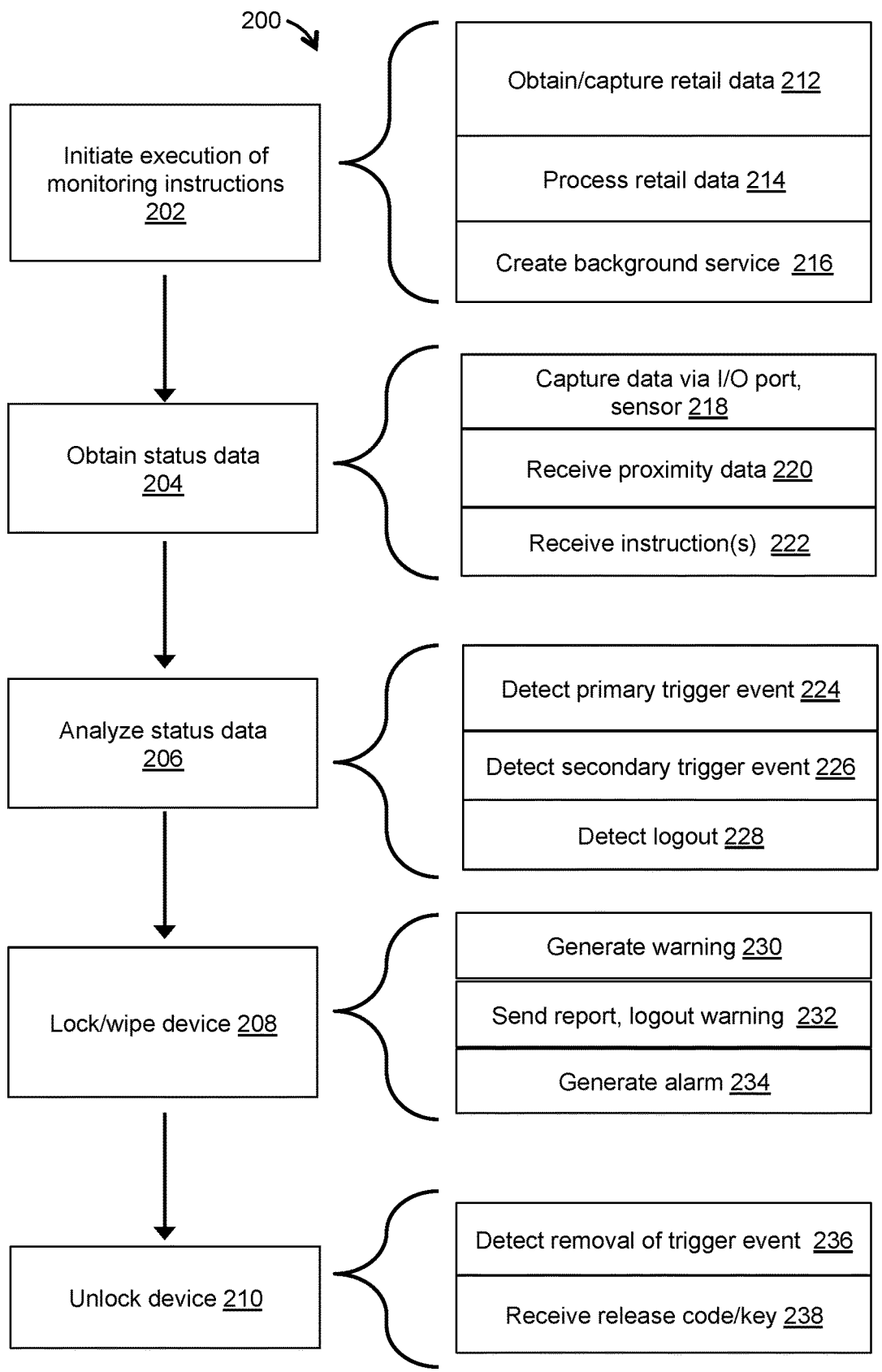
FIG. 2 is a flow diagram of a method of monitoring an electronic device on retail display in which integrated, persistent security monitoring is provided in accordance with one example.

FIG. 2 is a flow diagram of a method 200 of monitoring an electronic device on retail display. The method 200 is implemented by the electronic device itself. For instance, the method 200 may be implemented by the processor 102 of the electronic device 100 described above in connection with FIG. 1. The characteristics of the processor and electronic device may vary from the examples described above.

The acts of the method 200 may be implemented in accordance with the above-described boot instructions and/ or the security monitoring instructions. Any combination of the instructions may be used. Some or all of the method 200 may be implemented in accordance with solely the boot instructions or solely the security monitoring instructions. The instructions may be stored in persistent memory and non-volatile storage as described above.

One or more acts of the method 200 may be implemented within a persistent or background service running on the processor. For instance, the acts implemented in accordance with the security monitoring instructions may be executed within the persistent or background service. Acts not implemented within a persistent or background service may be implemented in connection with a boot procedure. For instance, one or more acts directed to initiating the persistent or background service may be implemented during and via the boot procedure.

The method 200 may begin with one or more acts directed to booting up the electronic device. For instance, the acts may be implementing an activation, startup, or restart (or reboot) of the electronic device. Any number of startup-related acts may be performed before security-related instructions are implemented.

The method 200 includes an act 202 in which boot instructions are executed to initiate, in turn, execution of security monitoring instructions. The boot instructions are stored in a persistent memory of the electronic device as described above. The nature of the boot instructions may vary. For instance, the boot instructions may include a general or specific callout or other reference to a routine(s) or other instructions that either directly or indirectly results in the execution of the monitoring instructions. Alternatively or additionally, the boot instructions may include instructions in addition to a callout or other reference to implement security-related tasks, such as one or more tasks related to determining whether to initiate the security monitoring.

The execution of the monitoring instructions leads to an act 204 in which status data indicative of a status of the retail display is obtained in accordance with the security monitoring instructions. The nature of the status data may vary as described above. For instance, the status data may be indicative of a position or other condition or characteristic of the electronic device, a condition of the retail display, or a message or communication relating to the retail display or retail environment, such as an alarm message.

In act 206, the status data is analyzed in accordance with the security monitoring instructions to monitor the status of the retail display for a security trigger event. The analysis may vary in accordance with the nature of the status data. For instance, the analysis may include or involve a data evaluation or other data processing, e.g., to determine whether the electronic device is within a zone. Alternatively or additionally, the analysis may involve evaluation of a data transmission.

If a trigger event is detected, one or more user interfaces of the electronic device are locked in an act 208. The user interface may be a touchscreen of the electronic device. The locking may inhibit some or all of the input/output functions of the user interface(s). For instance, the locking may not allow any data input in some cases. In other cases, the touchscreen may present a data entry field to allow an unlock code to be provided.

The act 208 may be implemented in a timely fashion. For instance, the locking of the user interface of the electronic device may be implemented before removal of the electronic device from the retail site in which the retail display is provided. The display of a message via the touchscreen and/or other user interface may provide an alert that dissuades any further movement or actions. Upon seeing the message, a prospective thief may no longer attempt to steal the electronic device. The message may also help a prospective consumer that inadvertently causes a trigger event avoid triggering a higher level alarm.

As described above, the locking of the act 208 may vary in accordance with the trigger event. Different types of trigger events may cause different levels or types of locking. In some cases, the act 208 includes actions or operations in addition to the locking. For instance, the electronic device may capture images via a camera, send alert and other messages to an alarm unit and/or law enforcement, and otherwise capture and/or generate data in connection with the trigger event.

In some cases, the act 208 includes implementation of a data wiping procedure. The data wiping procedure may remove user data from the electronic device and/or return the electronic device to factory settings and/or another state (e.g., a retail display state). The data wiping procedure may be implemented in connection with, or separately from, a locking. The data wiping procedure may be implemented at other points during the method.

In act 210, the electronic device is unlocked. The steps taken to unlock the electronic device may vary. In some cases, removal of the trigger event is sufficient to unlock the electronic device. A higher level of locking may necessitate the performance of one or more additional steps to unlock the electronic device, including, for instance, the provision of an unlock code.

Initiating the execution of the monitoring instruction in the act 212 may include one or more acts directed to determining whether and how to execute the monitoring instructions. For instance, in an act 212, retail data is captured or otherwise obtained. The retail data may be indicative of the identity of the electronic device (e.g., device identification data), the identity or other characteristic of the retail site (e.g., store identification data), and/or the identity or other characteristic of the retail environment (e.g., display fixture data). The retail data may then be processed in an act 214 to determine whether security monitoring should be initiated. The processing may involve checking a remote database or other communication or analysis. In the event that the security monitoring is deemed to be appropriate for the particular electronic device, display site, and/or display fixture, then the monitoring instructions are executed. In some cases, a persistent or background service is created in an act 216 within which the monitoring instructions are executed.

The status data obtained in the act 204 may be captured or received in various ways. In some cases, the status data is captured in an act 218 via an input/output port and/or a sensor of the electronic device. For example, an accelerometer may detect movement indicative of a theft attempt. Alternatively or additionally, an antenna may detect a change in a signal. Other signals may be detected or not detected to obtain the status. For instance, proximity data be received or otherwise used by the electronic device in an act 220. Other types of data may also be received by the device as status data. For instance, in an act 222, the device receives one or more instructions, such as a message from an alarm unit regarding an alarm or other status condition.

The analysis of the status data in the act 206 may vary in accordance with the nature of the status data and/or the type of trigger events to be detected. For example, the status data may be evaluated or processed to an extent to determine whether the status data is indicative of a trigger event. Alternatively or additionally, the analysis includes or involves demodulation and/or other processing of a signal indicative of instructions or other messages. In these and other ways, one or more types or levels of trigger events may be detected. In the example of FIG. 2, the analysis may lead to the detection of a primary trigger event in an act 224, and a secondary trigger event in an act 226. In some cases, the analysis of the status data may be detect an improper or unauthorized logout, login, or shutdown attempt in an act 228. These attempts may or may not be associated with an attempt to thwart the security monitoring. For instance, the attempt may be an attempt to change the user profile from a generic retail profile to a specific user profile.

The locking of the device in the act 208 may include or involve generating a warning in an act 230. In some cases, the warning is generated on a display of the electronic device. The warning may display a message regarding a locking of the electronic device until the trigger event ends. Alternatively or additionally, a report regarding the trigger event may be generated and sent in an act 232. For example, a message may be sent to an alarm unit, store employee, or other system operator or component. The report or other message may relay details regarding the trigger event, such as the details of a logout attempt. In some cases (e.g., with a primary trigger event), the act 208 includes or results in the generation of an alarm that cannot be deactivated by discontinuing the trigger event. For instance, an attempt to discontinue the alarm, warning, or other device lock by shutting down the device (e.g., powering off the device) would result in the device remaining in the locked state once the device is powered back on. Knowing that the device will remain locked, a prospective thief will be deterred from stealing the device.

The unlocking of the device in the act 210 may vary based on the nature of the trigger event and/or the level of the locking. In some cases, the device is unlocked in an act 236 upon the detection of the removal of the trigger event. In other cases, a release code or key is received in an act 238 to unlock the device. The manner in which the device is unlocked may vary as described above.

The order of the acts of the above-described method 200 may differ from the example shown in FIG. 2. For instance, status data may be received concurrently with the initiation of the execution of the monitoring instructions. Status data may also be received concurrently with the analysis of other, previously received status data.

Figure 3:
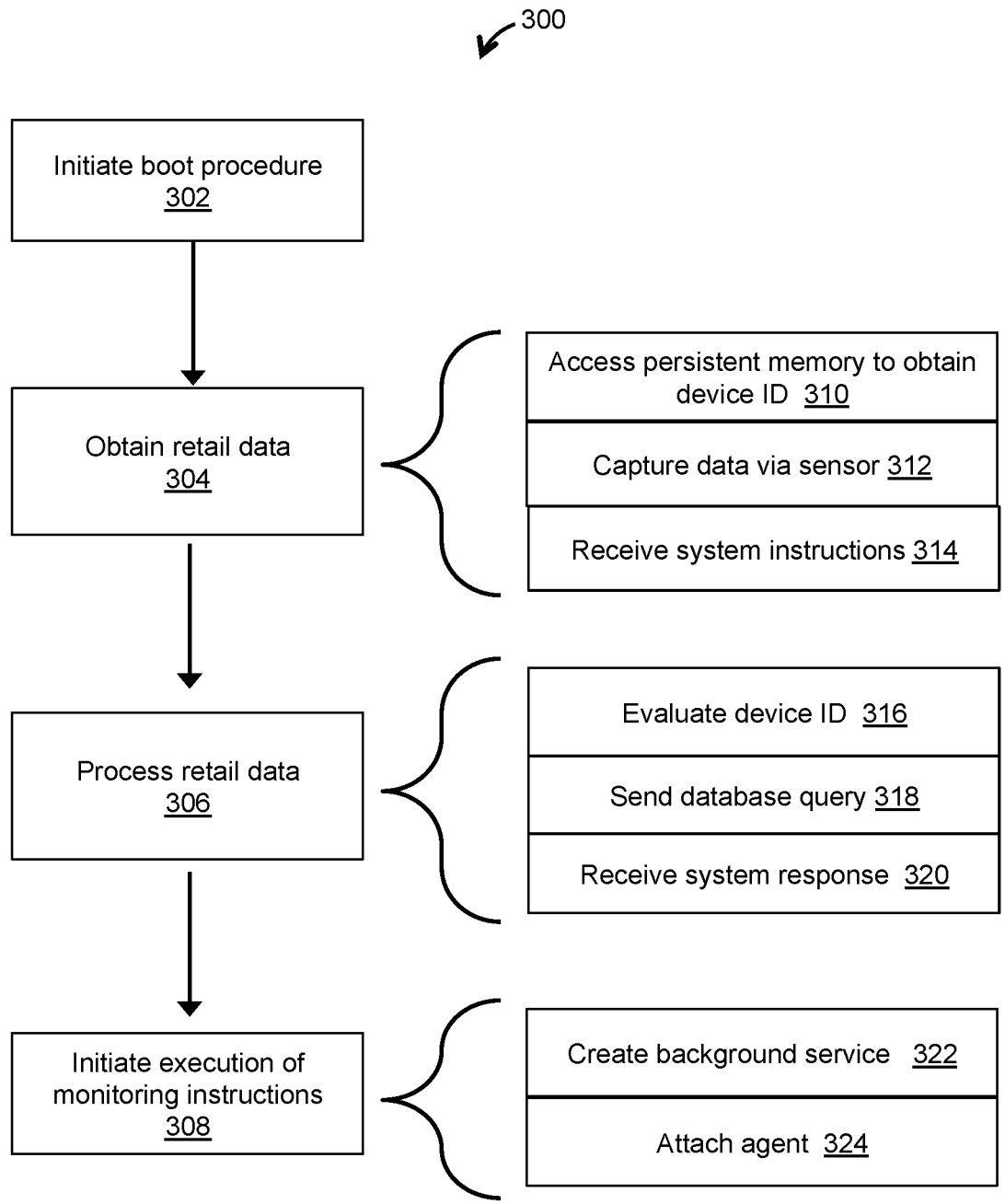
FIG. 3 is a flow diagram of a method of establishing integrated, persistent security monitoring for an electronic device on retail display in accordance with one example.

FIG. 3 depicts a method 300 of establishing security monitoring for an electronic device on retail display. The method 300 is implemented by the electronic device itself. For instance, the method 300 may be implemented by the processor 102 of the electronic device 100 described above in connection with FIG. 1. The characteristics of the processor and electronic device may vary from the examples described above.

The acts of the method 300 may be implemented in accordance with the above-described boot instructions as described above. In other cases, the acts of the method 300 are implemented in accordance with other instructions stored in a persistent memory of the electronic device.

One or more acts of the method 300 may be implemented as part of a startup or other boot procedure. In the example shown, the method 300 begins with initiation of a boot procedure in an act 302. Alternatively, the method 300 may begin after one or more acts directed to booting up the electronic device. For instance, multiple acts directed to an activation, startup, or restart (or reboot) of the electronic device may have been previously implemented. Any number of startup-related acts may be performed before acts of the method 300 are implemented.

The method 300 includes an act 304 in which retail data is obtained. The retail data is indicative of either the electronic device or the retail display. In the former case, the retail data may be or include device identification data, such as a serial number. In the latter case, the retail data may be or include retail site identification data. Other types of retail data may be used. For example, the retail data may be or include data indicative of a retail fixture within the retail site.

In an act 306, the retail data is processed. The retail data is processed to determine whether to initiate execution of the security monitoring instructions. For example, in cases in which the retail data is indicative of the identity of the device (e.g., a device serial number), the processing of the retail data may determine whether the instance of the specific device is one for which security monitoring is desired.

Execution of the monitoring instructions is initiated in an act 308 in accordance with results of processing the retail data, e.g., if the processing reveals that security monitoring is appropriate. For example, the boot instructions may cause the processor to implement a callout or other reference to the monitoring instructions that passes control thereto.

In the example of FIG. 3, the acts 304, 306 and 308 are implemented via execution of instructions stored on a persistent memory of the electronic device. In other cases, one or more of the acts are implemented via execution of instructions stored elsewhere, such as on a storage device.

The manner in which the retail data is obtained in the act 304 may vary, e.g., in accordance with the nature or type of the retail data. For instance, in some cases, the retail data is obtained by accessing the persistent memory of the electronic device in an act 310. In such cases, the retail data may be or include a device identification number, such as a serial number. Alternatively or additionally, the retail data is captured via a sensor or other component (e.g., an input port) of the electronic device in an act 312. For example, a camera of the electronic device may capture an image of a QR or other code indicative of a device identification number or other identification data, such as a retail site number or display fixture number. Other sensors or components may be used, including, for instance, a near-field communications (NFC) antenna. In still other cases, the retail data is obtained in an act 314 via receipt of instructions from, e.g., an alarm system.

The processing of the retail data in the act 306 may include or involve an evaluation of the retail data in an act 316. For example, a device identification number may be evaluated to determine whether the particular instance of the electronic device should be monitored. In some cases, the evaluation or other processing includes or involves sending a database or other query in an act 318. The query may seek to determine whether the device identification number is listed in a database of currently monitored devices. A system response message or other instructions may then be received in an act 320. The system instructions may differ in non-database examples.

When the monitoring instructions are to be executed, the act 308 may include creation of a persistent or other background service in an act 322. Alternatively or additionally, an agent of the monitoring instructions is attached to a persistent or background service in an act 324. The persistent or background service is or will be running on the processor of the electronic device. In some cases, the agent is defined via the security monitoring instructions. Other acts may be implemented in accordance with the nature or content of the boot instructions.

The order of the acts of the method 300 may differ from the example shown in FIG. 3. For instance, the product identification data may be obtained before or concurrently with the sensor identification data.

The above-described methods may include additional, fewer, or alternative acts. For instance, the method 200 and/or the method 300 may include one or more additional acts directed to data wiping and/or other housekeeping of the electronic device.

Described above are devices and methods for providing security monitoring and benefit denial of electronic merchandise. In some aspects, the methods include or involve monitoring the electronic device for a trigger, and locking, upon detection of the trigger, the electronic device. In other aspects, the devices include a memory configured to store firmware instructions that, when executed, configure a processor of the electronic device to provide security monitoring and benefit denial. The processor may be configured to monitor, via the firmware instructions, the electronic device for a trigger, and lock, with the firmware upon detection of the trigger, the electronic device. Aspects of the method may be performed via a background application or other service running on the processor. Examples of triggers are disconnection from an external power source, loss of data integrity, movement of the device, and loss of communication. The methods and devices may provide the security monitoring in connection with a security system configured to generate an alarm upon detection of the trigger. Ins some cases, the alarm is generated prior to locking the device as a result of, for instance, an attempted theft of other merchandise on display.

The above-described devices and methods may be used or implemented to provide a software solution for instant theft deterrence for electronic products and devices. The disclosed devices and methods may provide for data analytics and alerts regarding the status of, and user interactions with, electronic products and devices. Aspects of the disclosed devices and methods may be implemented via, or otherwise involve, the firmware of the electronic device. Other aspects may be implemented via, or otherwise involve, a software application or other instructions running on the device. In some cases, a combination of firmware and application software may be used. For example, the software solution may be installed in the basic input/output system (BIOS) or other boot instructions (e.g., bootloader) or other firmware of a device in order to lock and unlock the device based on one or more triggers. The software solution may also be configured to provide local and remote status, alerts and other data regarding the device. Data analytics and alerts regarding the status of and user interactions with electronic products and devices may be provided.

By incorporating aspects of the software solution in the firmware or other persistent of the device, the software solution cannot be overcome by hard resetting the device (e.g., a hardware or factory reset). For example, during a hard reset, the core hardware components are reset to factory settings, deleting most software installed on the device. By installing the software solution in the firmware or persistent memory of the device, a hard reset of the device does not delete or otherwise remove the software solution. In some cases, a hard reset triggers a locking or benefit denial.

One or more aspects of the software solution may be installed as a software application (e.g., an app) on the device. Installation of a software application may be useful in connection with electronic devices for which the firmware is not capable of being customized. For example, a software application may be used in connection with electronic devices commercially available from Apple. In some cases, these aspects of the solution are implemented as a persistent application(s). For example, persistent applications reload or are reinstalled upon being closed or uninstalled. Additionally, in some cases, if the software application is uninstalled, the application will reinstall itself, such as using an internet, mobile or other network connection. Therefore, if a user deletes the software application, the application will be auto re-downloaded and installed on the device.

The disclosed methods and systems are well suited for implementation by, and use with, any electronic product capable of executing instructions, including any electronic devices having firmware or other persistent memory, such as laptops, computer, tablets, mobile phones, wearables, smart televisions and other computing-based consumer, commercial and/or industrial electronic products. The software solution may be implemented via any combination of firmware and software.

The disclosed devices and methods provide a software solution for immediate benefit denial of an electronic device. The benefit denial locks the device based on one or more triggers. By locking the device, the device is rendered unusable (e.g., bricked). If one or more of the triggers are no longer present, the benefit denial is removed and the device is unlocked. By using a software solution installed on the device, the security monitoring need not rely on an internet connection, key, user intervention or other connectivity to lock and unlock the device, although such elements may be optional in some cases.

The nature of the alarms or benefit denial may vary as described above. One or more alarms and/or benefit denials may be activated based on one or more triggers. Any trigger detectable by the software solution may be used.

The software solution may trigger the alarm and/or benefit denial based on losing connection to an external power source. For example, in a low security environment (e.g., a corporate or educational environment) where the device may not be physically secured to the location, the device may be plugged into external power. Therefore, unplugging the device from a power source may trigger an alarm or the benefit denial. Further, the software solution may only trigger an alarm and may not include benefit denial (e.g., in a low security environment).

The software solution may use loss of data integrity as a trigger. For example, using the external USB or other port on the device, the software solution may communicate with an external USB "dongle," such as a solid-state memory stick or other custom USB device attached to the device. Integrity of the USB port may be determined and used as a trigger. The software solution may monitor the USB data connection (e.g., data activity) and may trigger based on losing the connection. The software may also read and/or write a specific data "key" or other data to a USB solid state memory. Further, the software solution may read and validate periodic "pings" from the USB device.

The software solution may use specific motion as a trigger. For example, the device may include an accelerometer to detect movement of the device. Using information gathered from the device, the software solution may detect mechanical shock or other movements to be used as triggers. For example, a mechanical shock might indicate that the device is being forcibly removed from a display or other security product, or may have been dropped or damaged. Further, the software solution may detect that the device is being picked up and moved (e.g., a user walking or running with the device). The software solution may also trigger on being removed from a display or fixed location, such as if the device is removed from a location for longer than a threshold (e.g., long dwell times).

The software solution may also access a near field communication (NFC) or radio-frequency identification (RFID) reader on the device (e.g., in a mobile handset). The software solution may read and/or write to external NFC tags and/or other NFC-enabled devices monitor the device location, identification, etc. The software solution may also read and/or monitor connection with RFID-enabled tags and/or other device. For example, low-frequency (LF), high-frequency (HF), ultra-high-frequency (UHF), or other RFID technology may be used. The software solution may also access other functionality of the device (e.g., wi-fi, mobile, Bluetooth, etc.) to monitor the device and trigger the alarms and/or benefit denial. For example the software solution may be triggered if the device can no longer communicate with a networking device, such as a router, hub, main alarm, etc.

In some cases, a Wi-Fi, Bluetooth, or other communication channel is configured to be invisible or inaccessible to unapproved users. For example, a communication channel used for triggering is not directly visible or accessible to the general public (e.g., users who are shopping for or using the products in the retail environment). By making the communication channel invisible inaccessible, the communication channel and/or the security solution is more difficult to disable and/or modify (e.g., settings, passwords, etc.). Further, use of the communication channel may be limited (e.g., preventing users from using the network and/or from incurring data charges).

The benefit denial may be removed manually and/or automatically. For example, in some cases, the device may be unlocked automatically if one or more of the triggers are no longer present. User intervention may also be used (e.g., needed) to unlock the device. In other cases, for example, if one or more of the triggers are no longer present, a PIN, key or other security information may be used (e.g., needed) to unlock the device. Other manual intervention may be used.

The disclosed devices and methods may also provide local and remote instant status, alerts and alarms. For example, instant visual and audible notifications and alarms may be displayed on the device display and through the device speaker(s). For example, device status may include a physical position, an "armed" setting, a device in motion alert, etc. Any status may be provided based on the capabilities of the device. E-mail and text notifications and other alerts may be provided based on the device status.

The disclosed devices and methods may also capture interactive data from the device. For example, the disclosed devices and methods may log user interactions and usage on the device, such as device lift and place events and dwell times. The disclosed devices and methods may also log electronic interactions with the device, such as communication events with other devices. The interactive data may be captured and stored as timestamps in a database. The disclosed devices and methods may be configured to provide analytics for the device based on the data. The data and/or analytics may be uploaded to a local or remote (e.g., cloud-based) server. The uploaded data may be used by the server or other device to provide analytics on the device.

The disclosed devices and methods may also provide for preventative maintenance and remote monitoring. For example, when a device is used by a large number of users, such as when displayed for sale or used in multi-user environment, the disclosed devices and methods may be used to perform maintenance and "housekeeping" for the device. Using the software solution, installed applications, pictures, browsing histories, etc. may be deleted from the device. The "housekeeping" may be performed manually or automatically, such as periodically (e.g., once per day or other periodic rate specified) to automatically search and clean the devices of unwanted clutter. The software solution may also factory reset the device remotely. Additionally, configuration of the firmware or software application may be performed remotely (e.g., "over-the-air" configurability from a remote connection).

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device configured for retail display, the electronic device comprising:
   a persistent memory on which boot instructions are stored as firmware such that the boot instructions are implemented during a factory reset;
   a storage device on which security monitoring instructions are stored; and
   a processor configured to execute the boot instructions during the factory reset and other boot sequences to initiate execution of the security monitoring instructions;
   wherein the processor is further configured, via the execution of the security monitoring instructions, to monitor the electronic device for a plurality of security trigger events and, upon detection of one of the plurality of trigger events, lock a user interface of the electronic device,
   wherein the plurality of security trigger events comprise a first trigger event and a second trigger event,
   wherein the security monitoring instructions define the first and second trigger events such that, upon discontinuation of the first or the second trigger event, the user interface is not or is automatically unlocked, respectively, and
   wherein the security monitoring instructions define the first and second trigger events such that the user interface is locked before removal of the electronic device from a retail site in which the retail display is provided.

2. The electronic device of claim 1, wherein execution of the boot instructions causes the processor to determine whether to initiate the execution of the security monitoring instructions.

3. The electronic device of claim 1, wherein execution of the boot instructions causes the processor to attach an agent defined via the security monitoring instructions to a persistent service running on the processor.

4. The electronic device of claim 1, wherein execution of the boot instructions causes the processor to send a query with identification data indicative of an identity of the electronic device to a remote database to determine whether to initiate the execution of the security monitoring instructions.

5. The electronic device of claim 4, wherein execution of the boot instructions causes the processor to access the persistent memory to obtain the identification data.

6. A method of monitoring an electronic device on retail display, the method comprising:
   executing, by a processor of the electronic device, boot instructions stored in a persistent memory of the electronic device as firmware such that the boot instructions are implemented during a factory reset, execution of the boot instructions initiating execution of security monitoring instructions by the processor of the electronic device, the security monitoring instructions being stored on a storage device of the electronic device;
   obtaining, by the processor in accordance with the security monitoring instructions, status data indicative of a status of the electronic device;
   analyzing, by the processor in accordance with the security monitoring instructions, the status data to monitor the status for a plurality of security trigger events; and
   if one of the plurality of security trigger events is detected, locking, by the processor in accordance with the security monitoring instructions, a user interface of the electronic device,
   wherein the plurality of security trigger events comprise a first trigger event and a second trigger event,
   wherein the security monitoring instructions define the first and second trigger events such that, upon discontinuation of the first or the second trigger event, the user interface is not or is automatically unlocked, respectively, and
   wherein the security monitoring instructions define the first and second trigger events such that the user interface is locked before removal of the electronic device from a retail site in which the retail display is provided.

7. The method of claim 6, wherein the security monitoring instructions are executed within a background service running on the processor.

8. The method of claim 6, wherein the storage device is non-volatile.

9. A method of establishing security monitoring for an electronic device on retail display, the method comprising:
   obtaining, by a processor of the electronic device, retail data indicative of either the electronic device or the retail display;
   processing, by the processor of the electronic device, the retail data to determine whether to initiate execution, by the processor of the electronic device, of security monitoring instructions stored on a storage device of the electronic device;
   initiating, by the processor of the electronic device, the execution of the security monitoring instructions in accordance with results of processing the retail data;
   obtaining, by the processor in accordance with the security monitoring instructions, status data indicative of a status of the electronic device;
   analyzing, by the processor in accordance with the security monitoring instructions, the status data to monitor the status for a plurality of security trigger events; and
   if one of the security trigger events is detected, locking, by the processor in accordance with the security monitoring instructions, a user interface of the electronic device,
   wherein obtaining the retail data, processing the data, and initiating the execution, are implemented via execution, by the processor of the electronic device, of boot instructions stored on a persistent memory of the electronic device as firmware such that the boot instructions are implemented during a factory reset, wherein the plurality of security trigger events comprise a first trigger event and a second trigger event, wherein the security monitoring instructions define the first and second trigger events such that, upon discontinuation of the first or the second trigger event, the user interface is not or is automatically unlocked, respectively, and wherein the security monitoring instructions define the first and second trigger events such that the user interface is locked before removal of the electronic device from a retail site in which the retail display is provided.

10. The method of claim 9, wherein:

obtaining the retail data comprises accessing identification data indicative of an identity of the electronic device, and processing the retail data comprises evaluating the identification data.

11. The method of claim 10, wherein accessing the identification comprises accessing the persistent memory of the electronic device.

12. The method of claim 9, wherein processing the retail data comprises communicating with a server computer to evaluate the retail data against a database on the server computer.

13. The method of claim 9, wherein initiating the execution causes the processor to attach an agent defined via the security monitoring instructions to a background service running on the processor.

* * * * *